US008197330B2

(12) United States Patent
Englman et al.

(10) Patent No.: US 8,197,330 B2
(45) Date of Patent: Jun. 12, 2012

(54) GAMING SYSTEM HAVING INCREMENTALLY ACTIVATED BONUS AWARDS

(75) Inventors: Allon G. Englman, Chicago, IL (US); Joel R. Jaffe, Glenview, IL (US)

(73) Assignee: WMS Gaming Inc., Waukegan, IL (US)

( * ) Notice: Subject to any disclaimer, the term of this patent is extended or adjusted under 35 U.S.C. 154(b) by 368 days.

(21) Appl. No.: 12/522,615

(22) PCT Filed: Dec. 14, 2007

(86) PCT No.: PCT/US2007/025617

§ 371 (c)(1),
(2), (4) Date: Jul. 9, 2009

(87) PCT Pub. No.: WO2008/085294

PCT Pub. Date: Jul. 17, 2008

(65) Prior Publication Data

US 2010/0056252 A1 Mar. 4, 2010

Related U.S. Application Data

(60) Provisional application No. 60/879,729, filed on Jan. 10, 2007, provisional application No. 60/902,744, filed on Feb. 22, 2007.

(51) Int. Cl.
*A63F 9/24* (2006.01)
*A63F 13/00* (2006.01)

(52) U.S. Cl. ............................... 463/20; 463/25; 463/30

(58) Field of Classification Search .................... 463/20, 463/25, 30

See application file for complete search history.

(56) References Cited

U.S. PATENT DOCUMENTS 3,275,322 A 9/1966 Burnside
4,721,307 A 1/1988 Okada
(Continued)

FOREIGN PATENT DOCUMENTS

AU 565 987 A 10/1987
(Continued)

OTHER PUBLICATIONS

PCT International Written Opinion corresponding to co-pending International Patent Application Serial No. PCT/US2007/025617, dated Jun. 9, 2008; 6 pages.

(Continued)

*Primary Examiner* — Peter DungBa Vo
*Assistant Examiner* — Mukund G Patel
(74) *Attorney, Agent, or Firm* — Nixon Peabody LLP

(57) ABSTRACT

A gaming system comprises a wager input device and a display for displaying a plurality of primary symbols, a first bonus reel, and a second bonus reel. The first and second bonus reels have a plurality of bonus symbols thereon. The system further comprises a controller operative to detect a primary wager, a first bonus wager, and a second bonus wager. The controller varies the primary symbols and spins and stops the first bonus reel and the second bonus reel to display a randomly selected outcome. The controller provides a primary award if the primary symbols display a winning outcome. The controller provides a first bonus award if the first bonus wager is detected and the first bonus reel displays a first bonus winning outcome, and provides a second bonus award if the second bonus wager is detected and the second bonus reel displays a second bonus winning outcome.

20 Claims, 6 Drawing Sheets

U.S. PATENT DOCUMENTS

| | | | | |
|---|---|---|---|---|
| 4,790,537 | A * | 12/1988 | Smyth et al. | 273/143 R |
| 5,205,555 | A | 4/1993 | Hamano | |
| 5,259,616 | A | 11/1993 | Bergmann | |
| 5,401,024 | A | 3/1995 | Simunck | |
| 5,449,173 | A | 9/1995 | Thomas et al. | |
| 5,456,465 | A | 10/1995 | Durham | |
| 5,494,287 | A | 2/1996 | Manz | |
| 5,584,763 | A | 12/1996 | Kelly et al. | |
| 5,697,843 | A | 12/1997 | Manship et al. | |
| 5,722,891 | A | 3/1998 | Inoue | |
| 5,788,573 | A | 8/1998 | Baerlocher et al. | |
| 5,794,964 | A | 8/1998 | Jones et al. | |
| 5,823,874 | A | 10/1998 | Adams | |
| 5,848,932 | A | 12/1998 | Adams | |
| 5,980,384 | A | 11/1999 | Barrie | |
| 5,997,401 | A | 12/1999 | Crawford | |
| 6,004,207 | A | 12/1999 | Wilson, Jr. et al. | |
| 6,033,307 | A | 3/2000 | Vancura | |
| 6,059,289 | A | 5/2000 | Vancura | |
| 6,173,955 | B1 | 1/2001 | Perrie et al. | |
| 6,179,711 | B1 | 1/2001 | Yoseloff | |
| 6,270,411 | B1 * | 8/2001 | Gura et al. | 463/20 |
| 6,270,412 | B1 | 8/2001 | Crawford et al. | |
| 6,328,649 | B1 * | 12/2001 | Randall et al. | 463/20 |
| 6,439,993 | B1 | 8/2002 | O'Halloran | |
| 6,494,454 | B2 | 12/2002 | Adams | |
| 6,517,432 | B1 | 2/2003 | Jaffe | |
| 6,551,187 | B1 | 4/2003 | Jaffe | |
| 6,558,253 | B1 | 5/2003 | DeSimone et al. | |
| 6,616,142 | B2 | 9/2003 | Adams | |
| 6,780,109 | B2 | 8/2004 | Kaminkow | |
| 6,805,349 | B2 | 10/2004 | Baerlocher et al. | |
| 6,805,632 | B2 | 10/2004 | Suda | |
| 6,866,583 | B2 | 3/2005 | Glavich et al. | |
| 6,905,406 | B2 | 6/2005 | Kaminkow et al. | |
| 6,921,335 | B2 | 7/2005 | Rodgers et al. | |
| 2002/0047238 | A1 | 4/2002 | Ainsworth et al. | |
| 2002/0052233 | A1 | 5/2002 | Gauselmann | |
| 2002/0082075 | A1 | 6/2002 | Meyer | |
| 2003/0013517 | A1 | 1/2003 | Bennett et al. | |
| 2003/0054874 | A1 | 3/2003 | Kaminkow | |
| 2003/0057645 | A1 | 3/2003 | Baerlocher et al. | |
| 2003/0060267 | A1 | 3/2003 | Glavich et al. | |
| 2003/0064779 | A1 | 4/2003 | Suda | |
| 2003/0064802 | A1 | 4/2003 | Rodgers et al. | |
| 2003/0069062 | A1 | 4/2003 | Shimizu | |
| 2003/0130030 | A1 | 7/2003 | Delott et al. | |
| 2003/0203752 | A1 | 10/2003 | Kaminkow et al. | |
| 2003/0203753 | A1 | 10/2003 | Muir et al. | |
| 2003/0207709 | A1 | 11/2003 | Paotrakui | |
| 2004/0038730 | A1 | 2/2004 | Suda | |
| 2004/0048646 | A1 | 3/2004 | Visocnik | |
| 2004/0048652 | A1 | 3/2004 | Ching et al. | |
| 2004/0053676 | A1 | 3/2004 | Rodgers | |
| 2004/0053683 | A1 | 3/2004 | Hartl et al. | |
| 2004/0072612 | A1 | 4/2004 | Rodgers et al. | |
| 2004/0137982 | A1 | 7/2004 | Cuddy et al. | |
| 2005/0020344 | A1 | 1/2005 | Kaminkow | |
| 2005/0049035 | A1 | 3/2005 | Baerlocher et al. | |
| 2005/0054412 | A1 | 3/2005 | Guaselmann | |
| 2005/0064924 | A1 | 3/2005 | Glavich et al. | |
| 2005/0101369 | A1 | 5/2005 | Meyer | |
| 2005/0101380 | A1 | 5/2005 | Glavich et al. | |
| 2005/0148384 | A1 | 7/2005 | Marks et al. | |
| 2005/0164775 | A1 | 7/2005 | Rodgers et al. | |
| 2006/0068892 | A1 | 3/2006 | Gomez et al. | |
| 2006/0073878 | A1 * | 4/2006 | Shackelford et al. | 463/20 |
| 2006/0073879 | A1 * | 4/2006 | Baerlocher | 463/20 |
| 2006/0121978 | A1 | 6/2006 | Hornik et al. | |
| 2006/0172796 | A1 | 8/2006 | Vancura | |
| 2006/0189377 | A1 | 8/2006 | Gomez et al. | |
| 2006/0189378 | A1 | 8/2006 | Aoki | |
| 2007/0066389 | A1 | 3/2007 | Kojima | |

FOREIGN PATENT DOCUMENTS

| | | |
|---|---|---|
| CA | 2 113 385 | 12/1998 |
| DE | 41 21 624 C1 | 11/1992 |
| EP | 0 798 676 A1 | 10/1997 |
| GB | 2 096 376 | 10/1982 |
| GB | 2 153 572 | 8/1985 |
| WO | WO 91 10974 | 7/1991 |

OTHER PUBLICATIONS

PCT International Search Report corresponding to co-pending International Patent Application Serial No. PCT/US2007/025617, dated Jun. 9, 2008; 3 pages.

Money Money Money, 4 Reel Mechanical; Worldwide Corporate Headquarters, Waukegan, IL, Aug. 29, 2005 (2 pages).

Ay Caramba, 4 Reel Mechanical, WMS Gaming; May 8, 2006 (2 pages).

Cow Tippin, 4 Reel Mechanical, Worldwide Corporate Headquarters, Waukegan, IL, Aug. 15, 2005 (2 pages).

Hot Hot Jackpots, 4 Reel Machanical, Worldwide Corporate Headquarters, Waukegan, IL, Aug. 15, 2005 (2 pages).

Mega Multiplier 125, Williams WMS Gaming Inc., Chicago, IL, 1999 (2 pages).

Money Belt, 4 Reel Mechanical, Worldwide Corporate Headquarters, Waukegan, IL, Aug. 15, 2005 (2 pages).

Power Ball, Introducing Powerball themed Progressive Slots, Worldwide Corporate Headquarters, Waukegan, IL, 2005 (4 pages).

Robin Hood's Sherwood Treasure, 4 Reel Machanical, Worldwide Corporate Headquarters, Waukegan, IL, Aug. 29, 2005 (2 pages).

Something for Nothing, 4 Reel Mechanical, WMS Gaming, May 3, 2006 (2 pages).

Thunder Struck, 3 Reel Mechanical Ring Series, Worldwide Corporate Headquarters, Waukegan, IL, Dec. 14, 2004 (2 pages).

"Pirate's Thunder" Game Brochure, Williams WMS Gaming Inc., Chicago, IL, 1996 (1 page).

"EuroSlot" Magazine Showing "Wheel of Fortune" Game, Apr. 1994 (3 pages).

* cited by examiner

GAMING SYSTEM HAVING INCREMENTALLY ACTIVATED BONUS AWARDS

CROSS REFERENCE TO RELATED APPLICATIONS

This application is a U.S. national stage of International Application No. PCT/US2007/025617, filed Dec. 14, 2007, which claims the benefit of U.S. Provisional Application No. 60/879,729, filed Jan. 10, 2007 and U.S. Provisional Application No. 60/902,744, filed Feb. 22, 2007, which are all incorporated by reference herein in their entireties.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a gaming system having incrementally activated bonus awards.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming systems with new types of bonus games to satisfy the demands of players and operators.

Traditionally, gaming machines provide players with various awards and prizes in both primary games and a variety of bonus games. One problem that arises is that the size and frequency of bonus award payouts is limited by the payback percentage of the gaming machine. Therefore, gaming machines which provide larger and more frequent bonus award payouts usually provide lower payback percentages during base game play, which in turn causes less exciting play and perhaps lowered appeal of the gaming machine as a whole. Another problem that exists is that possible bonus awards and outcomes are not readily visible or comprehensible by the player, who may not understand or take the time to gather the information available through the paytable, help screens, or the like. Yet another problem is that excitement of playing the gaming machine may be diminished by a lack of understanding of the potential for winning primary or bonus awards on the gaming machine. The present invention is directed to solving these and other problems.

SUMMARY OF THE INVENTION

According to one aspect of the present invention, a gaming system comprises a wager input device and a display for displaying a plurality of primary symbols, a first bonus reel, and a second bonus reel. The first and second bonus reels have a plurality of bonus symbols thereon. The system further comprises a controller operative to detect a primary wager, a first bonus wager, and a second bonus wager. The controller varies the primary symbols and spins and stops the first bonus reel and the second bonus reel to display a randomly selected outcome. The controller provides a primary award if the primary symbols display a winning outcome. The controller provides a first bonus award if the first bonus wager is detected and the first bonus reel displays a first bonus winning outcome, and provides a second bonus award if the second bonus wager is detected and the second bonus reel displays a second bonus winning outcome.

According to another aspect of the invention, a gaming system comprises a wager input device and a display for displaying a plurality of primary symbols and at least one bonus reel. The at least one bonus reel has a plurality of symbol positions, and the at least one bonus reel having a plurality of bonus symbols thereon. Each of the bonus symbols occupies at least two adjacent symbol positions. The system further comprises a controller operative to (i) detect a primary wager and in response thereto, vary the primary symbols to display a primary game outcome, (ii) spin and stop the bonus reel to display a bonus game outcome, (iii) award a primary award if the primary game outcome is a winning outcome, and (iv) if a primary award is awarded, award a bonus award if the bonus outcome includes one of the plurality of bonus symbols displayed entirely within a reel window surrounding the bonus reel.

According to yet another aspect of the invention, a method of conducting a wagering game on a gaming system comprises receiving a primary wager and displaying a plurality of primary reels and a first bonus reel, the primary reels having a plurality of primary symbols thereon. The first bonus reel is positioned within a first bonus reel window having M display positions. The first bonus reel has a plurality of symbol positions, and the first bonus reel has a plurality of bonus symbols thereon, at least one of the plurality of bonus symbols occupying N adjacent symbol positions, where M and N are integers greater than one. The method further comprises spinning and stopping the primary reels to display a primary game outcome, and spinning and stopping the first bonus reel to display a first bonus game outcome. The method further comprises awarding a primary award if the primary game outcome is a winning outcome, and if a primary award is awarded, awarding a first bonus award if the first bonus outcome includes the at least one of the plurality of bonus symbols displayed entirely within the first bonus reel window.

According to yet another aspect of the invention, a computer readable storage medium is encoded with instructions for directing a gaming system to perform the above method.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
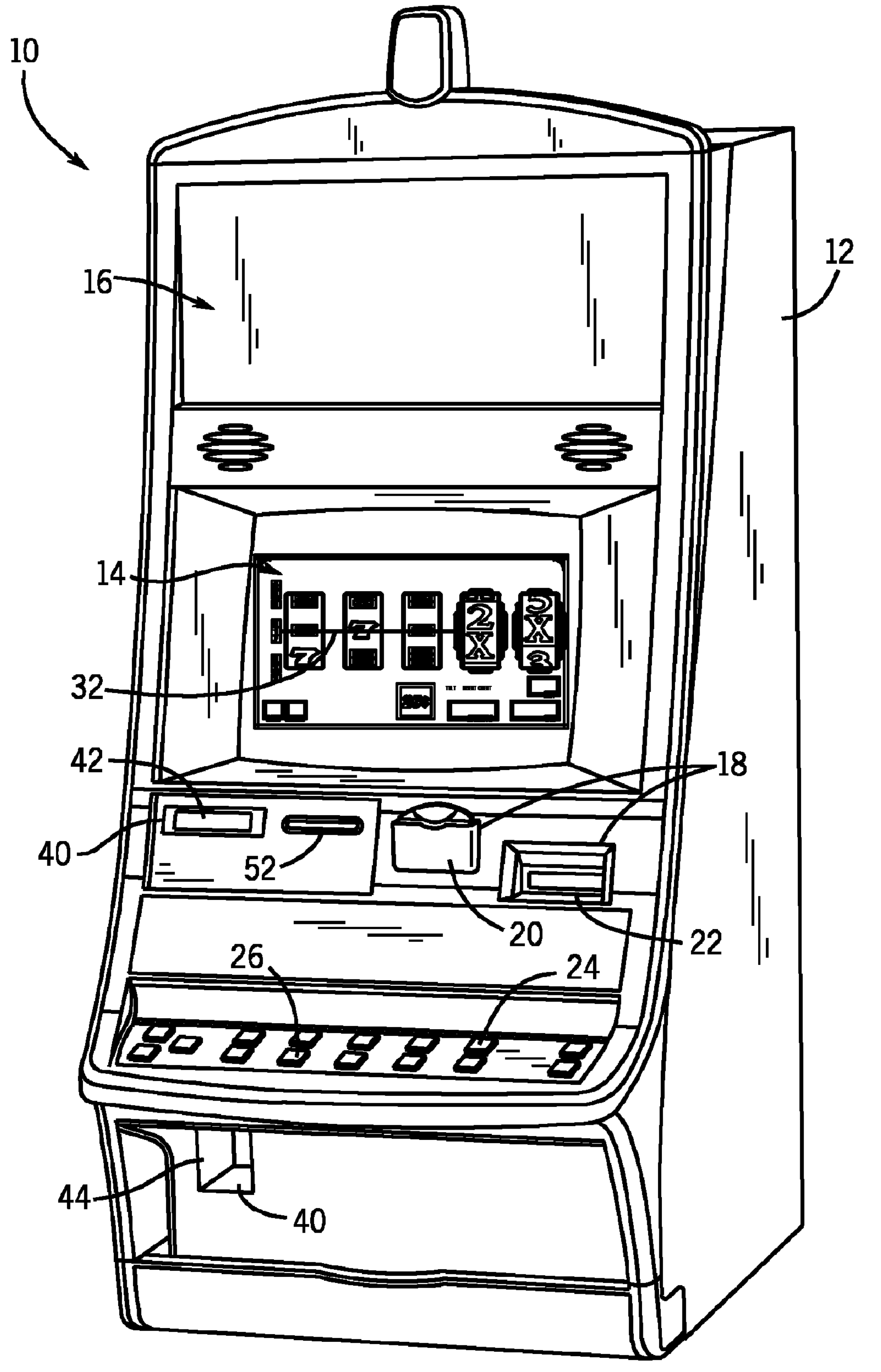
FIG. 1*a* is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
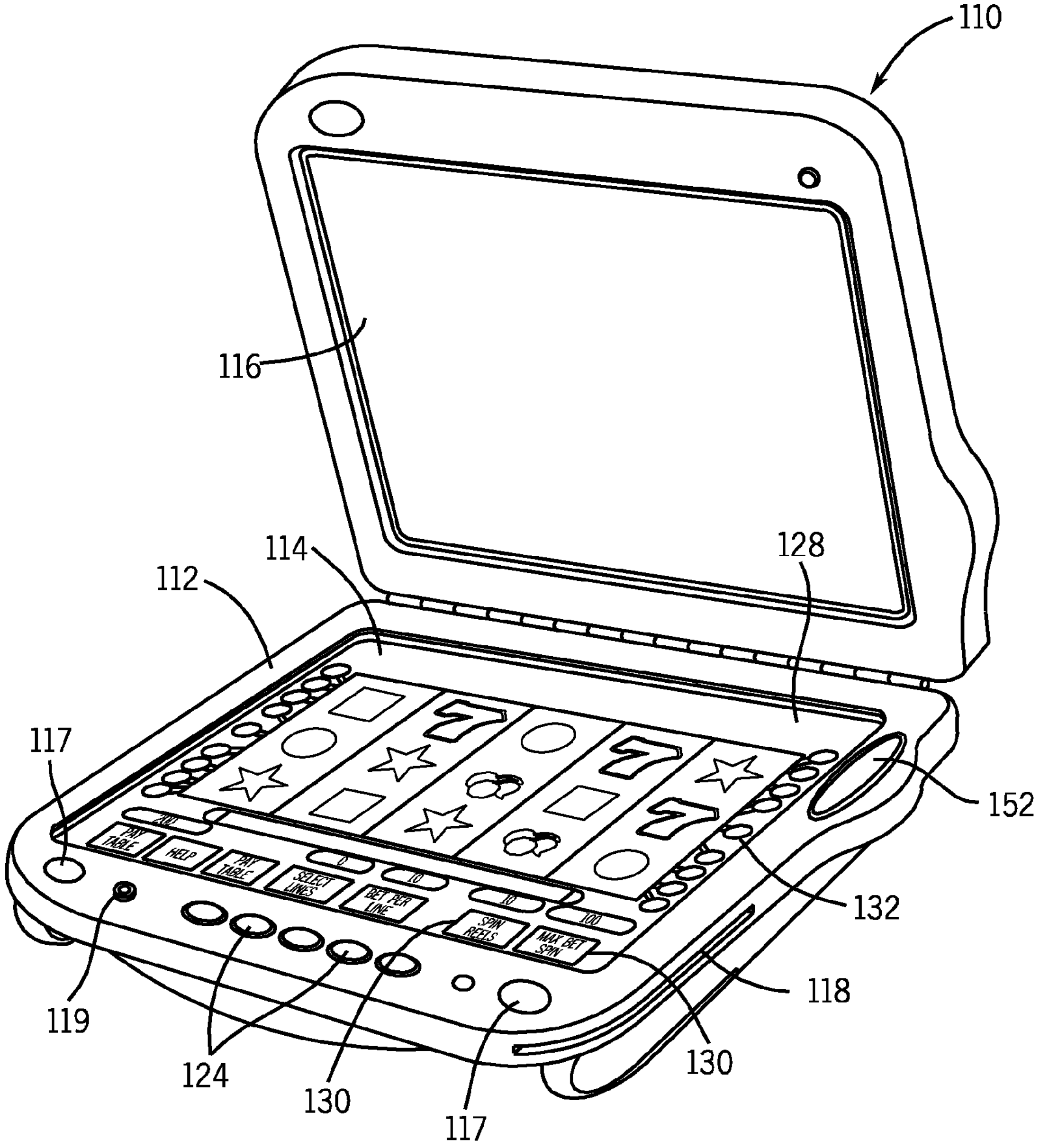
FIG. 1*b* is a perspective view of a handheld gaming machine embodying the present invention.

Depicted in FIG. 1*b* is a handheld or mobile gaming machine 110. Like the free standing gaming machine 10, the handheld gaming machine 110 is preferably an electronic gaming machine configured to play a video casino game such as, but not limited to, blackjack, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen mounted to a primary display 114 and/or secondary display 116. In one aspect, the touch screen is matched to a display screen having one or more selectable touch keys 130 selectable by a user's touching of the associated area of the screen using a finger or a tool, such as a stylus pointer. A player enables a desired function either by touching the touch screen at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
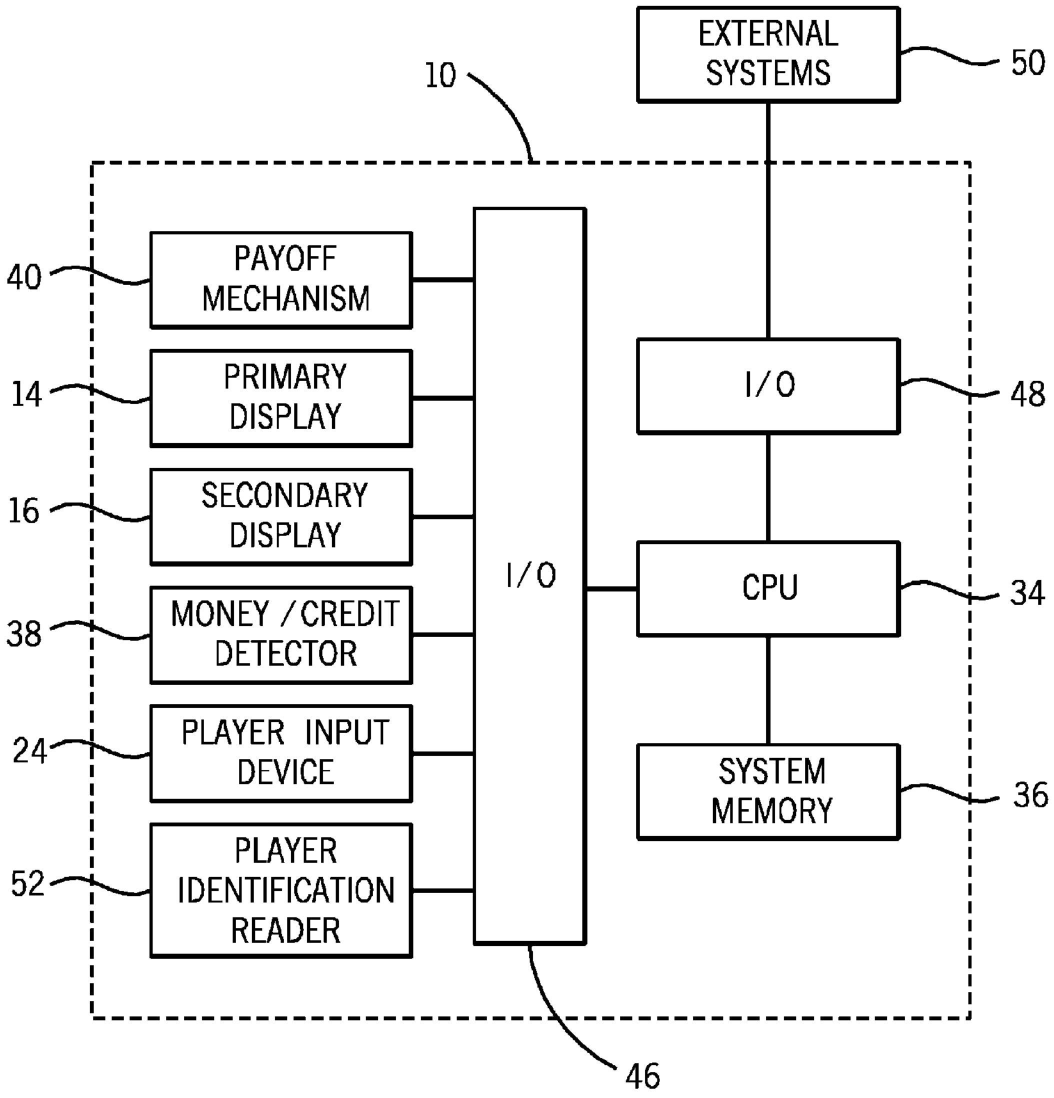
FIG. 2 is a block diagram of a control system suitable for operating the gaming machines of FIGS. 1*a* and 1*b;*

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality there between. As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "thicker client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Figure 3:
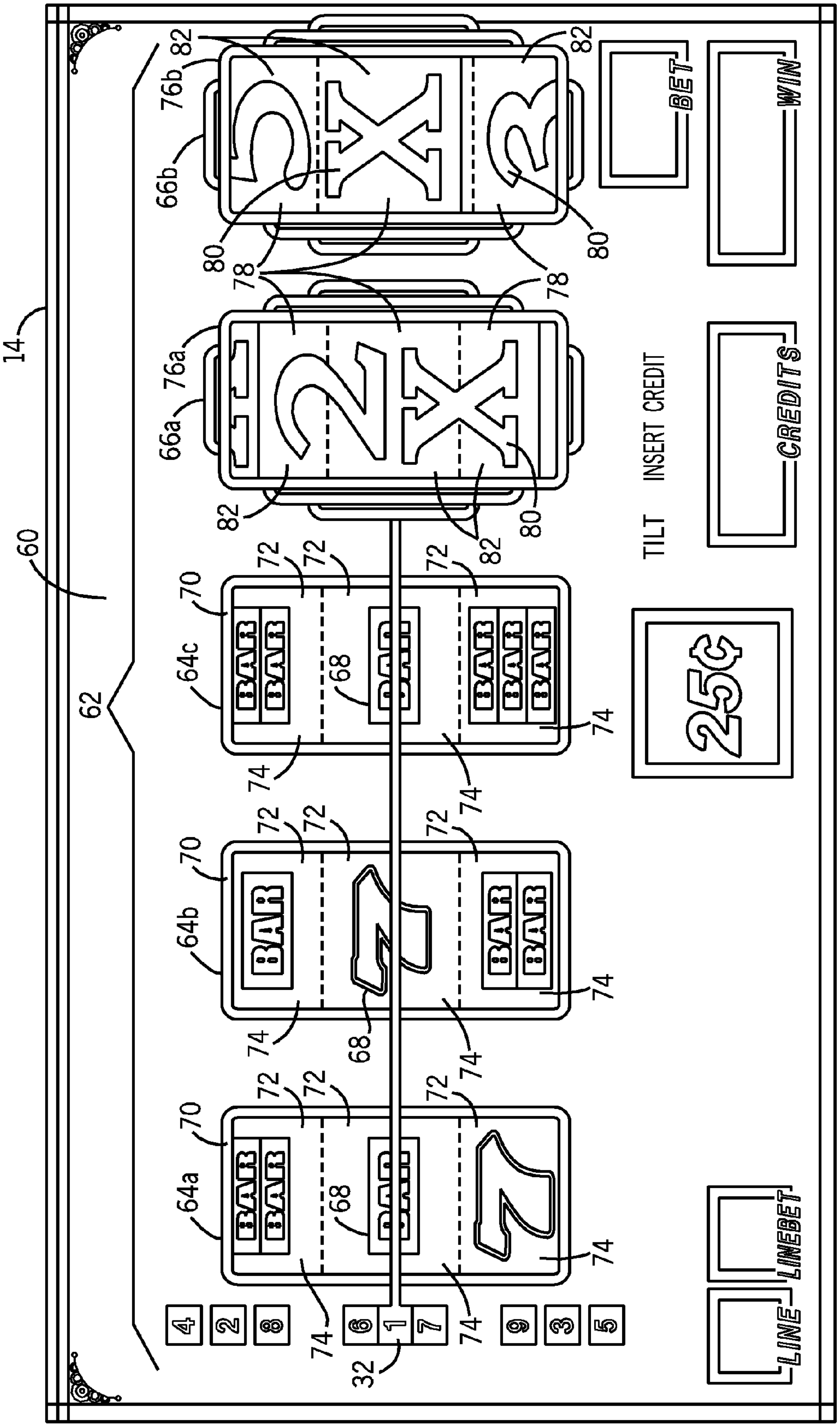
FIG. 3 is a front view of the primary display of a gaming system having incrementally activated bonus reels.

Turning now to FIG. 3, the primary display 14 of a gaming device displaying a wagering game according to the present invention is shown. The wagering game may be displayed on the display 14 of a free standing gaming machine 10 as shown in FIGS. 1*a* and 3, or on the display 114 of a handheld gaming machine 110 as seen in FIG. 1*b*. The display 14 in FIG. 3 includes a wagering game 60, which in this embodiment is a slot game. The slot game 60 includes a plurality of reels 62, which may be either electro mechanical reels or simulations thereof on the primary display 14. The reels 62 include a plurality of primary reels 64*a,b,c* and a plurality of bonus reels 66*a,b*. The primary reels 64 include a plurality of primary symbols 68 displayed thereon. One or more paylines 32 pass through and extend across the primary reels 64. As described herein the primary symbols 68 landing on the active paylines 32 (the paylines for which a wager has been received) are evaluated for winning combinations. If a winning combination of primary symbols 68 lands on an active payline 32, a primary award is awarded in accordance with a paytable of the gaming device.

In this embodiment, each of the primary reels 64 are displayed inside of, bordered by, and enclosed within a primary reel window 70 which include a plurality of display positions 72 located within the window 70. In FIG. 3, each primary reel window 70 has three vertically oriented display positions 72 each of which is occupied by one primary symbol 68 after the reels 64 have stopped. Thus, the display positions 72 define discrete locations within the reel windows 70 through which the active paylines 32 pass, and in which the primary symbols 68 of the primary reels 64 stop and are displayed. In this way, the primary reels 64 display a 3×3 matrix of symbols 68 arranged in nine display positions 72 arranged in three rows and three columns. As the primary reels 64 are spun and stopped from game to game, the primary symbols 68 landing in the display positions 72 are varied so as to produce a variety of outcomes and combinations of primary symbols 68, which include one or more winning combinations. The primary reels 64 further include a plurality of primary symbol positions 74 positioned around the periphery of the reel 64 so as to create or form a reel strip, which can be a physical reel strip (in the case of a mechanical or electro mechanical reel) or a virtual reel strip (in the case of a simulated reel on a video display). Thus, in the embodiment shown in FIG. 3, each of the primary symbols 68 occupies one of the symbol positions 74 on the primary reel 64. Stated differently, there is a one-to-one relationship between the number of symbol positions 74 and primary symbols 68 on the primary reels 64.

Similarly, each of the bonus reels 66 are also displayed inside of, bordered by, and enclosed within a bonus reel window 76. Each of the bonus reel windows 76 includes a plurality of bonus display positions 78. As seen in FIG. 3, each bonus reel window 76 has three display positions 78 oriented in a vertical alignment within the reel window 76. Like the primary reels 64, the bonus reels 66 include a plurality of bonus symbols 80 thereon. In an embodiment, the bonus symbols 80 are different multipliers which may be awarded to enhance the primary award provided for winning combinations achieved on the primary reels 64. In alternate embodiments, the bonus symbols 80 may be any variety of symbols which indicate various types of bonus awards which include credit awards, free spins, bonus triggers, or other bonus awards described herein.

The bonus reels 66 further include a plurality of bonus symbol positions 82 positioned around the periphery of the reel 66 so as to create or form a reel strip, which can be a physical reel strip (in the case of a mechanical or electro mechanical reel) or a virtual reel strip (in the case of a simulated reel on a video display). Therefore, as can be seen in FIG. 3, each of the bonus symbols 68 occupies more than one of the symbol positions 82 on the bonus reels 66. Specifically, in the embodiment shown, each of the bonus symbols 80 overlies three adjacent symbol positions 82 on the bonus reel 66. In this way, the bonus symbols 80 are multi-positional symbols. Moreover, as the bonus reels 66 spin and stop, one or more bonus symbol 80 may be viewable through the bonus reel windows 76. The display positions 78 of the bonus reel windows 76 may be occupied by all or portions of one or more of the bonus symbols 80.

The paylines 32 passing through the primary reels 64 do not extend through the bonus reels 66 or traverse the bonus reel windows 76. Therefore, although the paylines 32 are used to evaluate winning combinations of primary symbols 68 on the primary reels 64, they are not used to evaluate the bonus reels 66. Instead, the bonus reels 66 are evaluated based upon the positioning of the bonus symbols 80 within the bonus reel windows 76. In an embodiment, the bonus reels 66 award bonus awards corresponding to a bonus symbol 80 that stops substantially centered within one of the bonus reel windows 76. For example, in FIG. 3, the "2×" multiplier has landed substantially centered vertically in the first bonus reel window 76*a*. Thus, the player will be awarded the 2× multiplier associated therewith, provided that the player has also achieved a winning combination on the primary reels 64. In another embodiment, the bonus reels 66 award bonus awards if a bonus symbol 80 lands entirely within the reel window 76, such that the entirety of the bonus symbol 80 is visible. In FIG. 3, the entirety of the "2×" bonus symbol 80 has landed, and is visible, within the reel window 76 of the first bonus reel 66*a*. However, no bonus symbol 80 is entirely within the reel window 76 of the second bonus reel 66*b*. Rather only portions of the "5×" and "3×" multiplier bonus symbols 80 are visible on the second bonus reel 66*b*, so no bonus award is awarded for that reel 66*b*. In this way, the criteria for awarding the bonus award in FIG. 3 is that the bonus symbol 80 occupy all three display positions 78 within the bonus reel window 76.

In alternate embodiments, other positioning requirements may be used to determine whether a bonus award is awarded for a particular bonus reel 66. For example, the criteria may be that the bonus symbol 80 occupies selected display positions 78 within the reel window 76. In an embodiment, bonus awards may be awarded if a bonus symbol 80 on the bonus reel 66 occupies the top two display positions 78 in the bonus reel window 76. Thus, in FIG. 3, the “5×” multiplier bonus symbol 80 on the second bonus reel **66*b* would then be a bonus award winning outcome since that symbol 80 occupies both the top and middle display positions 78 of the three display positions 78 in the bonus reel window 76. In yet other alternative embodiments, other bonus award criteria may be required, such as color matching between bonus symbols 80 and display positions 78**.

Figure 4:
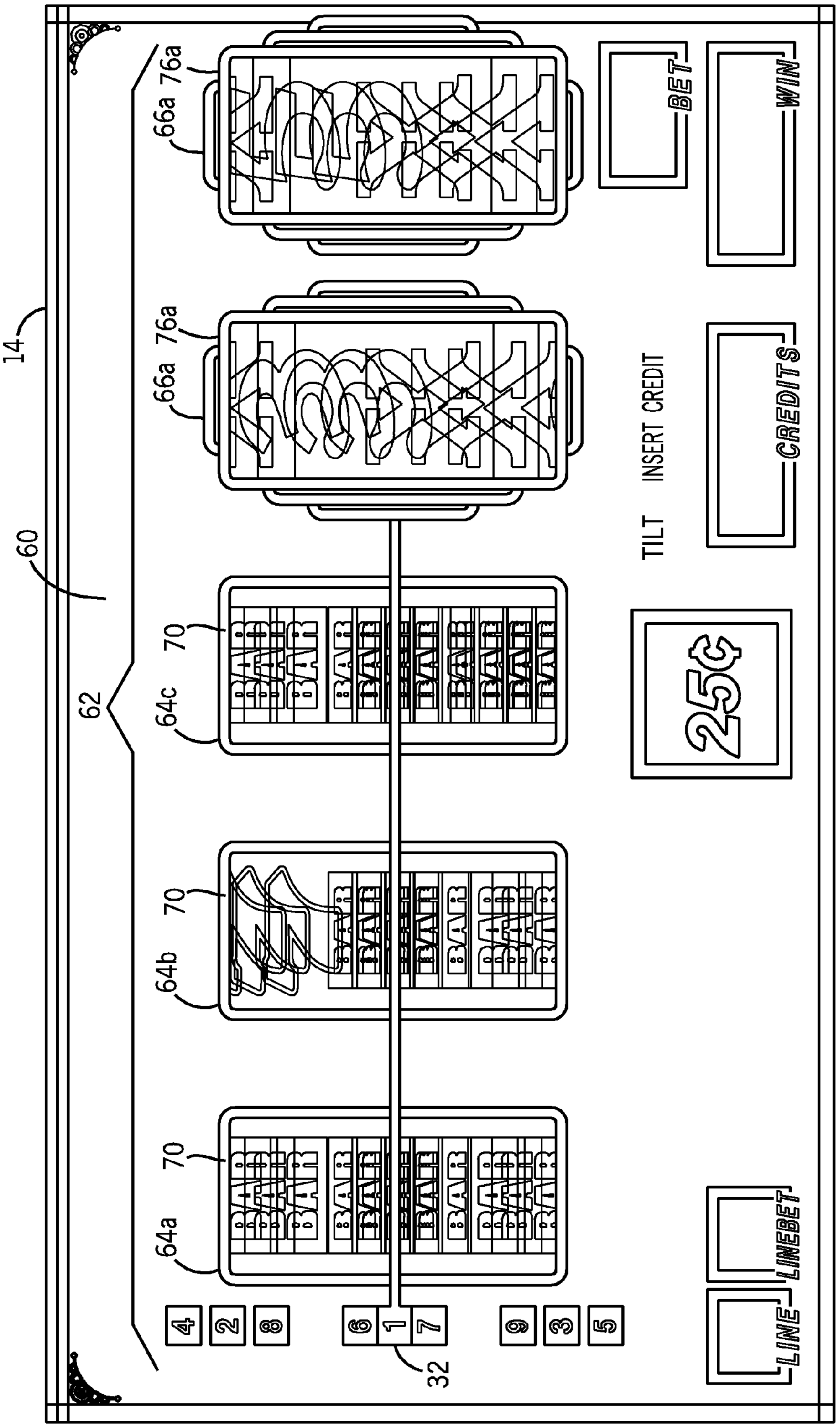
FIG. 4 is another view of the primary display of FIG. 3, wherein the reels are shown spinning.
Figure 5:
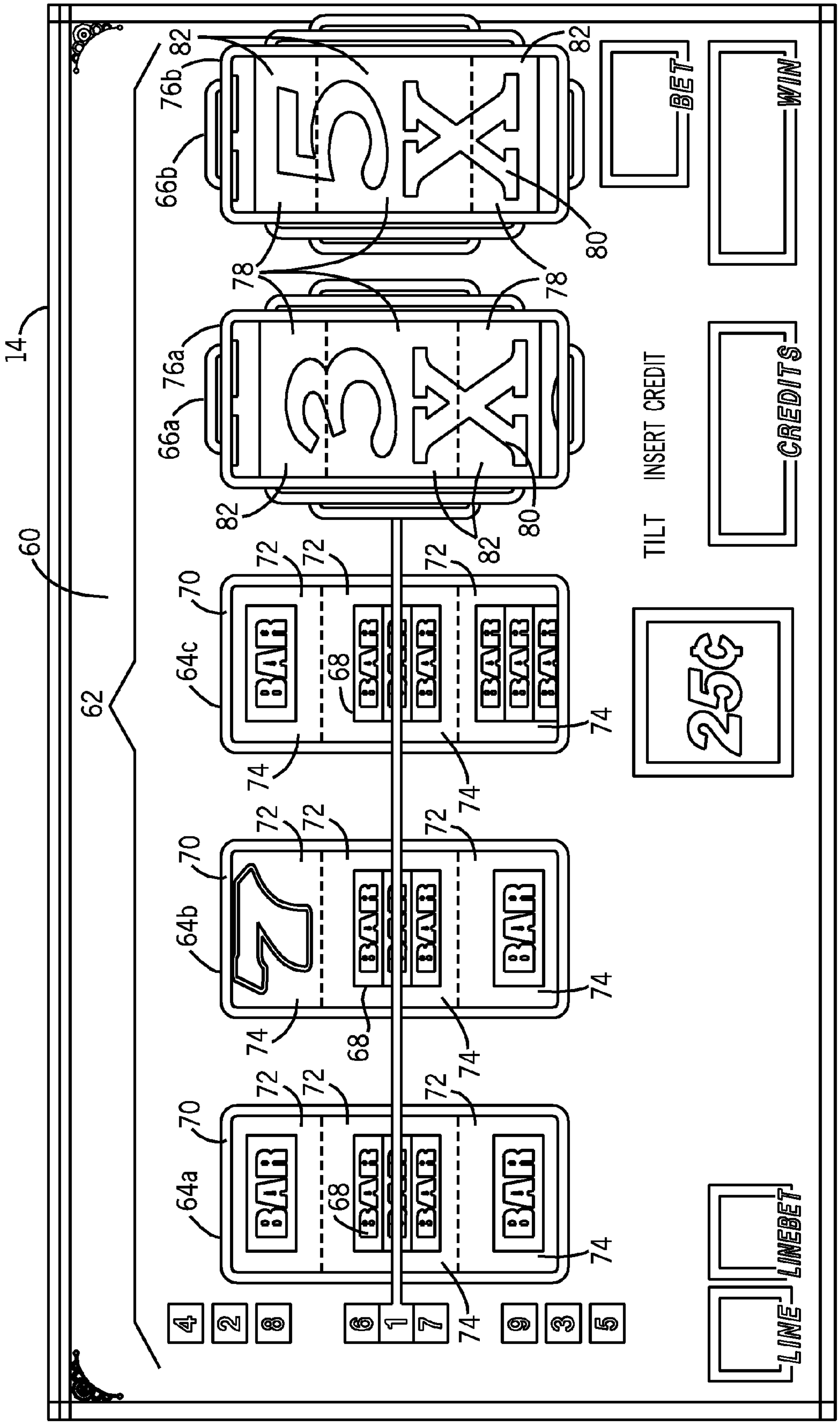
FIG. 5 is another view of the primary display of FIG. 3, depicting the result of a play of the gaming system.

During play of the wagering game 60 depicted in FIGS. 3-5, a player inserts or wagers a primary wager to play the primary wagering game 60, which is depicted on the primary reels 66. The primary wager may be of a predetermined amount, within a predetermined allowable range, or may be proportional to the number of paylines 32 upon which the player wishes to wager or activate. Once the primary wager is received by the gaming machine 10, then the player is permitted to execute a play of the wagering game 60. If the player wishes to be eligible to win the bonus awards depicted on the bonus reels 64, the player must also make additional wagers referred to as bonus wagers. In an embodiment, each of the bonus reels 66 must be wagered on for a player to be eligible to receive the bonus awards associated therewith. Thus, in addition to the primary wager to play the primary reels 64, a player must input a first bonus wager to be eligible for the first bonus reel **66*a* and a second bonus wager to be eligible for the second bonus reel 66*b***.

The bonus wagers may be of a minimum mandatory amount, or may be of a fixed amount. Alternatively, the bonus wagers may be required to be a function of the amount of the primary wager. Various additional eligibility criteria may be imposed with respect to the bonus wagers. For example, a player may be permitted to place the first and second bonus wagers only if they have placed a primary wager equal to or greater than a predetermined threshold or minimum amount. Moreover, a player may be required to place the largest possible primary wager (“max bet”) in order to be allowed to place the first and second bonus wagers. Additionally, the bonus wagers may have additional criteria such that the bonus wagers may be individually placed, or in another embodiment, required that both the first and second bonus wagers be placed in equal amounts. A player may be allowed to place a second bonus wager (on the second bonus reel **66*b*) only if he has already placed a first bonus wager (on the first bonus reel 66*a***). Other eligibility requirements may be imposed on the placing of the bonus wagers.

Once a player has a placed a primary wager, a first bonus wager, and a second bonus wager, the player may activate a play of the game (a spin of the reels), as seen in FIG. 4. In an embodiment, the player presses a “Spin” button located on the gaming machine to activate the play of the game. After the play of the game has been activated, all five reels 62 begin to spin together. In an embodiment, the primary reels 64 and the bonus reels 66 begin to spin at the same time and stop at the same time. In an alternative embodiment, all five reels 62 spin at the same time but are stopped sequentially from left to right, such that the primary reels 64 are stopped from left to right, then the first bonus reel **66*a* is stopped, and finally the second bonus reel 66*b* is stopped. This sequential presentation adds suspense to the outcome of the play of the wagering game 60**.

In yet another alternative embodiment, the bonus reels 66 may spin only if bonus wagers have been placed on those reels. For example, if a player places a first bonus wager and a second bonus wager, both bonus reels 66 spin together with the primary reels 64 as seen in FIG. 4. However, if a player places only a primary wager and no bonus wagers, only the primary reels 64 spin, and the bonus reels 66 remain stationary for that play of the game. If only a first bonus wager is a placed, then only the first bonus reel **66*a* spins with the primary reels 64. In a preferred embodiment, the spinning of all of the reels 62 is initiated at the same time, regardless of which wagers have been placed. In this way, the bonus reels 66 spin and stop on each play of the game along with the primary reels 64 so as to display bonus outcomes along with the outcome of the primary reels 64. The bonus awards, if any, depicted on the bonus reels 66, however, are only awarded if the requisite bonus wagers have been placed, and other award criteria have been met. By spinning and stopping the bonus reels 66** on each play of the game, additional anticipation and excitement is provided to the player who is permitted to view the bonus awards which might have been won had the requisite bets been made, and other criteria met.

Once the primary reels 64 and bonus reels 66 have been spun and stopped, the game is evaluated for winning combinations and bonus awards, and the player is awarded for any corresponding wins. As seen in FIG. 5, the primary reels 64 have stopped to reveal a winning combination along an active payline 32. In this case, three “Triple Bar” symbols 68 have landed along the middle row of display positions 72 on the primary reels 64. This three “Triple Bar” combination is a winning combination for which an award of 20 credits is paid in accordance with a paytable of the gaming device 10. In addition to the primary award of 20 credits, the player has achieved two bonus winning outcomes. On the first bonus reel **66*a*, a “3×” multiplier symbol 80 has landed substantially centered, and entirely within the reel window 76 of the reel 66*a*. Thus a first bonus award of a “3×” multiplier has been awarded. On the second bonus reel 66*a*, a “5×” multiplier symbol 80 has landed substantially centered, and entirely within the reel window 76 of the reel 66*b*, resulting in the award of a second bonus award of a “5×” multiplier. Thus the player is awarded the primary award of 20 credits, plus the two multipliers (“3×” and “5×”) which modify the primary award. In this embodiment, the two multipliers are multiplied together such that the total bonus award is “15×”, or the product of the two multipliers on the bonus reels 66** (“3×” and “5×”). Therefore, the total award achieved by the player is the primary award of 20 credits times the total bonus award of “15×” for a total of 300 credits.

In an alternative embodiment, the two multipliers may be added together rather than multiplied, such that the total bonus award is “8×” or the sum of the two multipliers on the bonus reels 66 (“3×” and “5×”). Various other award criteria may also be imposed on the bonus awards. For example, in one embodiment, the player may be eligible to win the bonus award on the second bonus reel **66*b* only if he has won the bonus award on the first bonus reel 66*a*. Thus, in FIG. 5, had the player not won the first bonus reel 66*a* (for example, if the “3×” symbol 80 was not completely within the reel window 76), then the player would not receive the bonus award on the second bonus reel 66*b*, even though the “5×” symbol 80 has landed entirely within the reel window 76. In other embodiments, the bonus reels 66*a,b* may be evaluated and awarded independently of one another such that a player may win a bonus award on the second bonus reel 66*b* without achieving a win on the first bonus reel 66*a***. Various other bonus award criteria may be utilized as well instead of, or in conjunction with the award criteria described herein.

Other bonus awards may be utilized on the bonus reels 66 instead of, or in addition to the multiplier values shown in the FIGURES. For example, the bonus awards may include credit awards, free spins, wild symbols, or symbols which trigger other bonus games. Moreover, the bonus awards may be symbol upgrades, cash awards, and even tangible prizes, such as jewelry, automobiles, or other prizes. Also, in the embodiments shown in the FIGURES, the display 14 includes two bonus reels 66. However, greater or fewer bonus reels 66 may be utilized in other embodiments. In embodiments with greater than two bonus reels 66, two or more bonus wagers may be required to achieve eligibility for the bonus awards depicted on the bonus reels 66. In one embodiment, a separate bonus wager may be required for each bonus reel 66 presented on the display 14. In other embodiments, a first bonus wager may purchase eligibility for a first set of bonus reels 66 while a second bonus wager purchases eligibility for a second set of bonus reels 66, and so on.

Moreover, the primary wagering game 60 in the FIGURES is depicted as a three reel electromechanical slot game. However, many varieties of primary games may be utilized in accordance with the present invention. Other configurations of primary reels 64 are possible. For example, the reels 64 may be either electromechanical or video simulations of reels. The symbols 68 on the primary reels 64 may be arranged and actuated in a number of ways, and may include grouped or "clumped" symbols, or multi-position symbols which cover more than one symbol position 74. The symbols 68 may be varied by spinning the reels 64 in a traditional manner, or the symbols 68 may fall down into place in the matrix through a cascading motion. Any number of various mechanisms may be utilized to fill the matrix of symbols 68 such that winning combinations therein may be evaluated.

In an embodiment, a gaming machine includes mechanical reels which comprise reel strips attached to the periphery of a rotatable cylindrical cage. Rotation of the cage by a motor or other means causes the reel strips to rotate and vary the display of symbols on the reel strips viewable from a front side of the gaming machine. During manufacturing, one or more manufacturers' part numbers are placed on the reel strips to ensure that the correct reel strips are utilized in manufacturing and assembly of the gaming machines (e.g., the reel strips are installed on the correct reels on the correct machine). In one embodiment, the part numbers are imprinted using UV sensitive, or UV responsive, ink such that the part numbers are visible only when exposed to ultra-violet (UV) light. In such a configuration, the part numbers are not visible when exposed only to standard visible light, but become visible during ultra-violet illumination. This permits the part numbers to be imprinted in font sizes relatively larger than those printed with traditional ink, which are purposely kept smaller to reduce and minimize their appearance. In one configuration, the part numbers are imprinted on a predetermined portion of the reel strips such that the reel must be placed in a predetermined position for the part numbers to be viewable from the front of the gaming machine. Thus, the reels must be turned to a predetermined or "home" position relative to the primary display of the gaming machine such that the part numbers may be exposed to UV light and become visible. In other embodiments, the part numbers may be repetitively placed on various portions of the reel strips such that the part numbers are visible under UV light regardless of the position of the reel strip. In an alternative configuration, the part number may be imprinted on the cage or other part of the reel assembly, such as on the cage, instead of or in addition to imprinting on the reel strip. The gaming machine may include a UV light source mounted therein and activated by a switch for verifying such part numbers. Alternatively or additionally, the part numbers may be verified by handheld or transportable UV light sources. By imprinting part numbers on reel strips in UV responsive ink, the manufacturing process of the gaming machine is improved since the part numbers of such reel strips can be verified during various phases, including receiving, assembly, final test, shipping, initial installation and maintenance/service calls.

In some embodiments, when a mechanical reel is spun and stopped, the stopping of the reel is accompanied by a sound to make the player more aware of the reel stopping and displaying an outcome. In one embodiment, a controller of the gaming machine is used to synchronize the mechanical stopping of the reel with the playing of the reel stop sound so as to avoid any delays or latency between the two. In such an embodiment, the controller monitors the software which generates spinning and stopping of the mechanical reels and causes actuation of the motors which spin the reels. By monitoring the software controlling actuation of the reels, the controller can detect when the executed software is about to stop the mechanical reel, and in turn can use such information to trigger playing of the appropriate sound at substantially the same time. This detection allows the "stopping sound" to be played in synchronization with the actual mechanical stopping of the reels, thereby providing a smooth, choreographed presentation to the player devoid of any delays or errors in timing.

The gaming system of the present invention offers a number of advantages over traditional gaming devices. Because additional bonus wagers are required to be eligible for available bonus awards, the expected value of the primary game may be maintained at a relatively higher level creating more exciting play. Moreover, because the bonus awards are displayed on each play of the game, the system offers an exciting mechanism for presenting bonus awards to a player but only awarding them if the requisite bonus wagers have been made. The system offers a range of wagering and game play options to a player who may wager on some, all, or none of the bonus reels 66 for a customized game play experience. Moreover, the presentation and evaluation of the outcome of the bonus reels 66 (the position of the multipositional bonus symbol 80 within the reel window 76) offers an easily understandable alternative to the traditional payline 32 method of evaluation which can often be confusing to players, particularly when the number of active paylines 32 increases.

Each of these embodiments and obvious variations thereof is contemplated as falling within the spirit and scope of the claimed invention, which is set forth in the following claims.

What is claimed is:

1. A gaming system comprising:

a wager input device;

a display for displaying a plurality of primary symbols, a first bonus reel, and a second bonus reel, the first and second bonus reels having a plurality of bonus symbols thereon, the first bonus reel being displayed within a first reel window having a first plurality of display positions and the second bonus reel being displayed within a second reel window having a second plurality of display positions; and a controller operative to:

(i) detect a primary wager, a first bonus wager, and a second bonus wager;

(ii) vary the primary symbols and spin and stop the first bonus reel and the second bonus reel to display a randomly selected outcome;

(iii) provide a primary award if the primary symbols display a winning outcome;

(iv) select at least one of the first plurality of display positions of the first reel window and provide a first bonus award if the first bonus wager is detected and the first bonus reel displays a first bonus winning outcome where one of the bonus symbols occupies the at least one selected display portion of the first reel window, the first bonus award being awarded independent of a payline; and (v) select at least one of the second plurality of display positions of the second reel window and provide a second bonus award if the second bonus wager is detected and the second bonus reel displays a second bonus winning outcome where one of the bonus symbols occupies the at least one selected display portion of the second reel window, the second bonus award being awarded independent of a payline.

2. The gaming system of claim 1, wherein the primary symbols are positioned on a plurality of primary reels, wherein the varying step comprises spinning and stopping the primary reels, wherein the first and second bonus reels at least partially spin prior to the primary reels being stopped.

3. The gaming system of claim 1, wherein the second bonus award is awarded only if the first bonus award is awarded.

4. The gaming system of claim 1, wherein the first bonus award is a first multiplier and the second bonus award is a second multiplier.

5. The gaming system of claim 4, wherein the primary award is multiplied by the sum of the first multiplier and the second multiplier.

6. The gaming system of claim 4, wherein the primary award is multiplied by the product of the first multiplier and the second multiplier.

7. A gaming system comprising:

a wager input device;

a display for displaying a plurality of primary symbols and a bonus reel, the bonus reel having a plurality of symbol positions and at least one bonus symbol thereon, the at least one bonus symbol occupying at least two adjacent symbol positions, the bonus reel being displayed within a reel window having a plurality of display positions; and a controller operative to (i) detect a primary wager and in response thereto, vary the primary symbols to display a primary game outcome, (ii) spin and stop the bonus reel to display a bonus game outcome, (iii) award a primary award if the primary game outcome is a winning outcome, and (iv) if a primary award is awarded, select at least two of the display positions of the reel window and award a bonus award if the bonus outcome includes the at least one bonus symbol displayed within the reel window such that the at least one bonus symbol occupies the at least two selected display positions, the bonus award being awarded independently of a payline.

8. The gaming system of claim 7, wherein the bonus outcome includes the at least one bonus symbol substantially centered within the reel window.

9. The gaming system of claim 7, wherein the at least one bonus symbol occupies three adjacent symbol positions of the at least one bonus reel.

10. The gaming system of claim 7, wherein the at least one bonus symbol is a multiplier value.

11. The gaming system of claim 10, wherein the bonus award is a multiplier corresponding to the multiplier value displayed on the at least one bonus symbol in the bonus outcome.

12. The gaming system of claim 7, wherein the controller is further operative to detect a bonus wager, wherein the bonus awarded is awarded only if the bonus wager is detected.

13. The gaming system of claim 7, further comprising a second bonus reel.

14. A method of conducting a wagering game on a gaming system, the method comprising:

receiving a primary wager;

displaying a plurality of primary reels and a first bonus reel, the primary reels having a plurality of primary symbols thereon, the first bonus reel positioned within a first bonus reel window having M display positions, the first bonus reel having a plurality of symbol positions, the first bonus reel having a plurality of bonus symbols thereon, at least one of the plurality of bonus symbols occupying N adjacent symbol positions, where M and N are integers greater than one;

spinning and stopping the primary reels to display a primary game outcome;

spinning and stopping the first bonus reel to display a first bonus game outcome;

awarding a primary award if the primary game outcome is a winning outcome; and if a primary award is awarded, selecting at least one of the M display positions of the first bonus reel window and awarding a first bonus award if the first bonus outcome includes the at least one of the plurality of bonus symbols displayed within the first bonus reel window such that the at least one of the plurality of bonus symbols occupies the at least one of the M selected display positions of the first bonus reel window, the first bonus award being awarded independently of a payline.

15. The method of claim 14, wherein M equals N.

16. The method of claim 14, wherein the first bonus award is a multiplier.

17. The method of claim 14, wherein the first bonus award is selected from the group consisting of a credit award, a free spin award, a bonus game trigger, a symbol upgrade, a cash award, and a tangible prize.

18. The method of claim 14, wherein the displaying step further includes displaying a second bonus reel positioned within a second bonus reel window having M display positions, the second bonus reel having a plurality of symbol positions, the second bonus reel having a plurality of second bonus symbols thereon, at least one of the second bonus symbols occupying N adjacent symbol positions, the method further comprising:

spinning and stopping the second bonus reel to display a second bonus game outcome; and if both a primary award and a first bonus award are awarded, selecting at least one of the M display positions of the second bonus reel window and awarding a second bonus award if the second bonus outcome includes the at least one of the second bonus symbols displayed within the second bonus reel window such that the at least one of the second bonus symbols occupies the at least one of the M selected display positions of the second bonus reel window, the second bonus award being awarded independently of a payline.

19. The method of claim 18, wherein the first bonus award is a first multiplier and the second bonus award is a second multiplier.

20. A computer readable storage medium encoded with instructions for directing a gaming system to perform the acts of:

receiving a primary wager;

displaying a plurality of primary reels and a first bonus reel, the primary reels having a plurality of primary symbols thereon, the first bonus reel positioned within a first bonus reel window having M display positions, the first bonus reel having a plurality of symbol positions, the first bonus reel having a plurality of bonus symbols thereon, at least one of the plurality of bonus symbols occupying N adjacent symbol positions, where M and N are integers greater than one;

spinning and stopping the primary reels to display a primary game outcome;

spinning and stopping the first bonus reel to display a first bonus game outcome;

awarding a primary award if the primary game outcome is a winning outcome; and if a primary award is awarded, selecting at least one of the M display positions of the first bonus reel window and awarding a first bonus award if the first bonus outcome includes the at least one of the plurality of bonus symbols displayed within the first bonus reel window such that the at least one of the plurality of bonus symbols occupies the at least one of the M selected display positions of the first bonus reel window, the first bonus award being awarded independently of a payline.

* * * * *